United States Patent [19]
Hettinga

[11] Patent Number: 5,762,852
[45] Date of Patent: *Jun. 9, 1998

[54] PROCESS FOR MAKING MOLDED-IN LAMINA HINGE

[76] Inventor: Siebolt Hettinga, 2123 NW. 111th St., Des Moines, Iowa 50325

[*] Notice: The term of this patent shall not extend beyond the expiration date of Pat. No. 5,336,460.

[21] Appl. No.: 284,386

[22] Filed: Aug. 2, 1994

Related U.S. Application Data

[63] Continuation-in-part of Ser. No. 89,617, Jul. 12, 1993, Pat. No. 5,336,460, which is a continuation-in-part of Ser. No. 759,929, Sep. 13, 1991, abandoned.

[51] Int. Cl.$^6$ .......................... B29C 45/04; B29C 45/14; B29C 45/16
[52] U.S. Cl. .......................... 264/251; 264/266; 264/275
[58] Field of Search .......................... 264/251, 266, 264/275, 316, 328.8, 510, 511, 254; 156/63, 242, 290, 297; 425/130, 120, 121

[56] References Cited

U.S. PATENT DOCUMENTS

| | | | |
|---|---|---|---|
| 2,335,222 | 11/1943 | Storch | 264/251 |
| 2,777,411 | 1/1957 | Geisler | 264/268 |
| 2,979,246 | 4/1961 | Liebeskind | 264/251 |
| 3,067,455 | 12/1962 | Reid | 264/251 |
| 3,154,617 | 10/1964 | Schenk et al. | 264/266 |
| 3,511,902 | 5/1970 | Santangelo | 264/251 |
| 3,755,031 | 8/1973 | Hoffman et al. | 264/250 |
| 4,065,539 | 12/1977 | Nadel | 264/251 |
| 4,112,030 | 9/1978 | Kremzow | 264/251 |
| 4,176,447 | 12/1979 | Brennan | 264/251 |
| 4,395,817 | 8/1983 | Asada et al. | 264/251 |
| 5,336,460 | 8/1994 | Hettinga | 264/251 |

FOREIGN PATENT DOCUMENTS

| | | | |
|---|---|---|---|
| 1239162 | 10/1959 | France | 264/251 |
| 57-163544 | 10/1982 | Japan | 264/268 |
| 137730 | 10/1952 | Sweden | 264/251 |

*Primary Examiner*—Jan H. Silbaugh
*Assistant Examiner*—Angela Ortiz
*Attorney, Agent, or Firm*—Brian J. Laurenzo; Kent A. Herink

[57] ABSTRACT

A process for making a hinged plastic article wherein a hinge formed from a deformable lamina is integrated with first and second thermoplastic members during injection of the plastic material. The deformable lamina is placed between the first mold section and the second mold section of an injection mold unit before the first mold section and the second mold section are clamped together to form injection mold cavities for the first and second thermoplastic members. A mold cavity dividing member separates the mold cavities for the first and second thermoplastic members. The deformable lamina at least partially extends into the mold cavity for the first thermoplastic member and the mold cavity for the second thermoplastic member as well as therebetween to form a hinge. The first mold section and the second mold section are then clamped together and a plastic material is injected into the mold cavities and in bonding securement of the deformable lamina. The mold cavity dividing member prevents the plastic material from passing between the mold cavities and from contacting the hinge portion of the deformable lamina. The resultant article is then removed from the mold unit with the deformable lamina hinge integrated with the first and second thermoplastic members. The deformable lamina may extend over the entire exterior or interior surfaces of the first and second thermoplastic members to form a combined hinge and exterior covering or interior lining respectively.

8 Claims, 2 Drawing Sheets

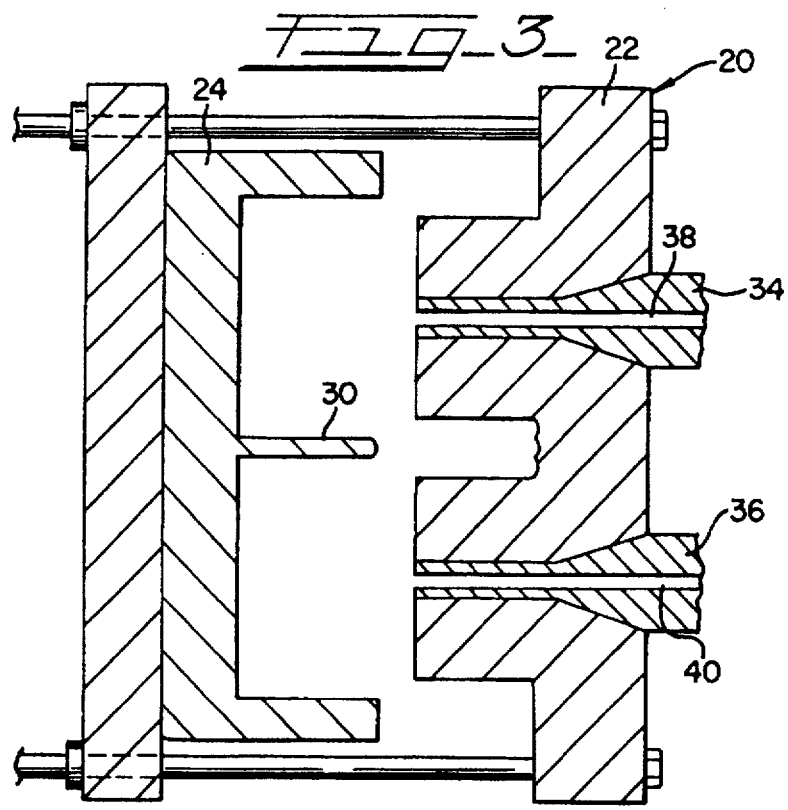
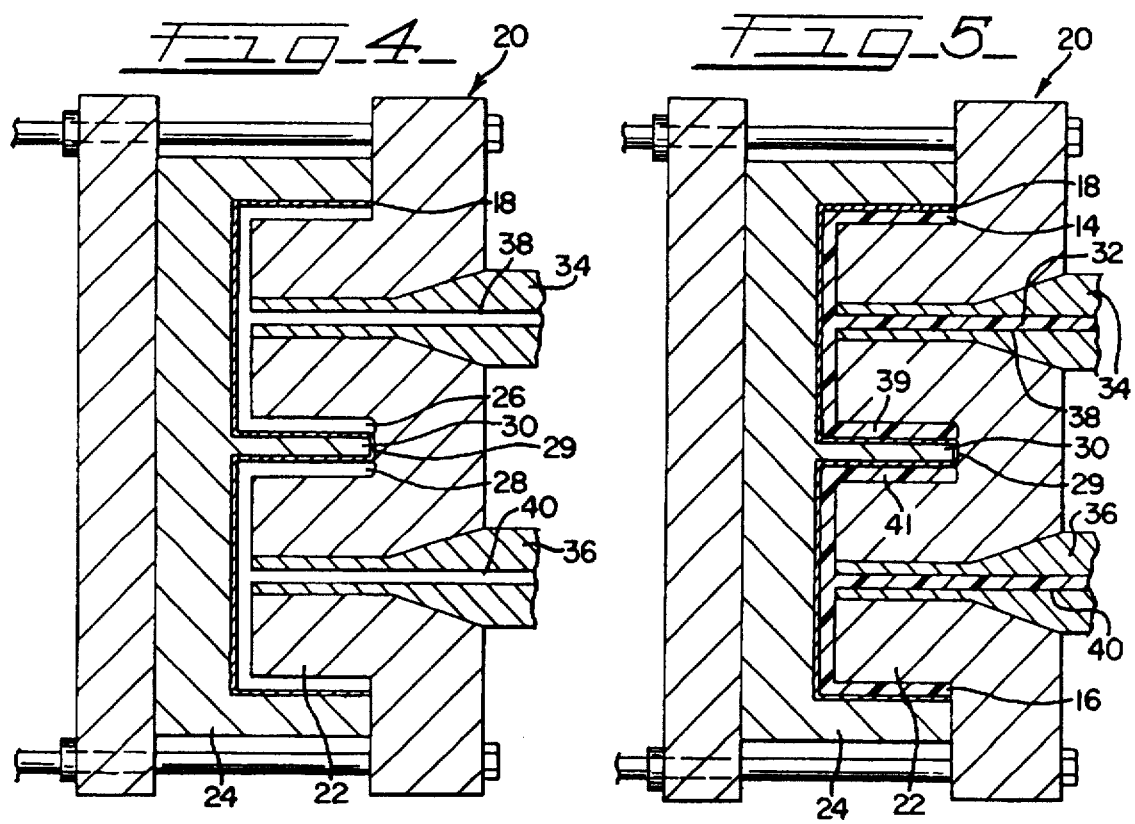

PROCESS FOR MAKING MOLDED-IN LAMINA HINGE

RELATED APPLICATIONS

This is a continuation-in-part of U.S. patent application Ser. No. 08/089,617, filed Jul. 12, 1993, now U.S. Pat. No. 5,336,460, entitled Process For Making Molded-In Lamina Hinge, which is a continuation-in-part of now abandoned U.S. patent application Ser. No. 07/759,929, filed Sep. 13, 1991, entitled Process For Making Molded-In Lamina Hinge.

BACKGROUND OF THE INVENTION

The present invention relates generally to the injection molding of plastics and, more particularly, to a plastic article having a hinge in the form of a deformable lamina which is integrated with first and second thermoplastic members during the injection of the plastic material.

In the past, in the manufacture of most hinged plastic articles, the hinged members, as well as the hinge therebetween, have all been molded in one plastic piece. The width and/or thickness of the plastic hinge between the hinged members is reduced thereby making the section flexible to enable the movement of the hinged members relative to one another. A problem with these hinged plastic articles is that the reduced width and/or thickness of the hinge section results in a weakened area which will gradually fatigue from repeated movement of the hinged members relative to one another until the section finally fails.

U.S. Pat. No. 3,755,031 discloses a die process whereby a resin is injected into a cavity and then a die is set into the resin. The preferred lamina of this reference is composed entirely of plastic. While alternative plastic and cloth laminas are disclosed in which the cloth side of the lamina is included to aid in the adhesion of the lamina to the curing resin, no means for keeping the resin from contacting the lamina hinge are disclosed. Accordingly, the benefits of a lamina hinge which is free of plastic material yet integrated with the hinged members of a plastic article during the injection molding of the plastic article are not present.

In addition, in the past, in order to attach a decorative covering or lining to a hinged plastic article which is made of fabric, vinyl or other deformable material, it has been necessary to glue or otherwise adhesively bond the material to the hinged thermoplastic members in a separate step, after the hinged plastic members have been molded. Such an additional step is labor intensive and time consuming thus making for an expensive process. Furthermore, the glue often releases after time resulting in an undesired appearance and an inferior product. In addition, many materials are not adhesively compatible with plastic to be securely bonded therewith by gluing.

The difficulties in the prior art hinged plastic articles and processes of manufacture are substantially eliminated by the present invention.

SUMMARY OF THE INVENTION

Accordingly, it is an object of the present invention to provide a process for molding a hinged plastic article wherein a hinge in the form of a deformable lamina is integrated with first and second thermoplastic members during injection of the plastic material.

Another object of the present invention is to provide a process for molding a hinged plastic article wherein a combined surface covering and hinge in the form of a deformable lamina is integrated with first and second thermoplastic members during injection of the plastic material.

By the present invention, it is proposed to overcome the difficulties encountered heretofore. To this end, a deformable lamina is placed between the first mold section and the second mold section of a plastic injection mold unit before the first mold section and the second mold section are clamped together to form injection mold cavities for first and second thermoplastic members. The first mold section has an extended mold cavity dividing member and the second mold section has a recess for receiving therein the extended mold cavity dividing member of the first mold section, upon clamping together of the first and second mold sections. The deformable lamina is extended between the mold cavity dividing member on the first mold section and the corresponding recess on the second mold section to form a hinge therebetween.

The first mold section and the second mold section are then clamped together using clamping means thereby forming mold cavities for the first thermoplastic member and the second thermoplastic member. Upon clamping, the mold cavity dividing member is placed over at least the hinge portion of the deformable lamina, the mold cavities separated by the mold cavity dividing member, the mold cavity dividing member allowing the deformable lamina to pass between the mold cavities. A first gate is provided through which a plastic injection material will be injected from outside the mold cavity of the first thermoplastic member into the mold cavity of the first thermoplastic member. A second gate is provided through which the plastic injection material will be injected from outside the mold cavity of the second thermoplastic member into the mold cavity of the second thermoplastic member.

The plastic material is then injected through the first and the second gates into the mold cavities and in bonding securement of the deformable lamina, the mold cavity dividing member preventing the plastic material from passing between the mold cavities and from contacting the hinge portion of the deformable lamina. The resultant thermoplastic article is then removed from the mold unit with the deformable lamina hinge integrated with the first and second thermoplastic members. Depending on the configuration of the mold unit and the positioning of the deformable lamina, the deformable lamina may extend over the entire exterior or interior surfaces of the thermoplastic members to form a combined hinge and exterior or interior lining respectively. No additional gluing steps are necessary.

BRIEF DESCRIPTION OF THE DRAWINGS

In the drawings:

FIG. 3 is a sectional elevation of a mold unit for forming the hinged plastic article shown in FIGS. 1 and 2 with the mold unit shown in an open position;

FIG. 4 is illustrated similarly to FIG. 3 showing the deformable lamina placed between the first mold section and the second mold section thereof and showing the mold unit in a closed position; and FIG. 5 shows the closed mold unit shown in FIG. 4 after a plastic has been injected into the closed mold.

DETAILED DESCRIPTION OF THE INVENTION

Figure 1:
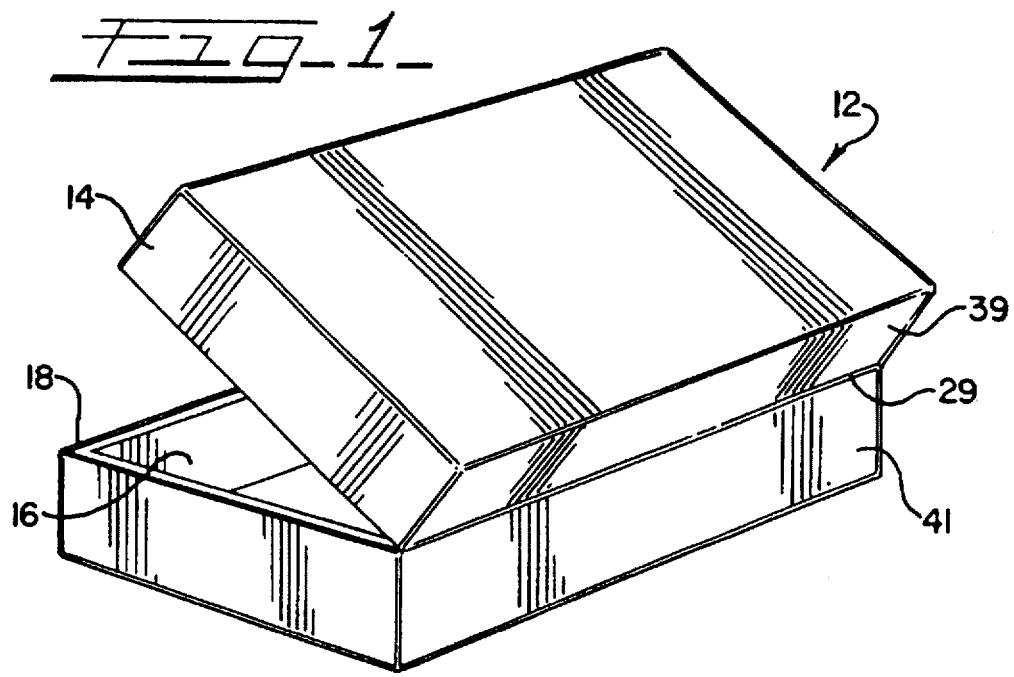
FIG. 1 is a perspective view of the exterior portion of a hinged plastic article having a combined deformable lamina cover and hinge integrated therein in accordance with the invention.

In the Figures, a hinged plastic article 12, specifically, a hinged storage container and the process for making same, is shown, the article 12 having a first thermoplastic member 14, a second thermoplastic member 16, and a single deformable lamina 18 for at least partially covering certain surfaces of the thermoplastic members 14 and 16, as well as hinging the thermoplastic members 14 and 16 together.

Figure 2:
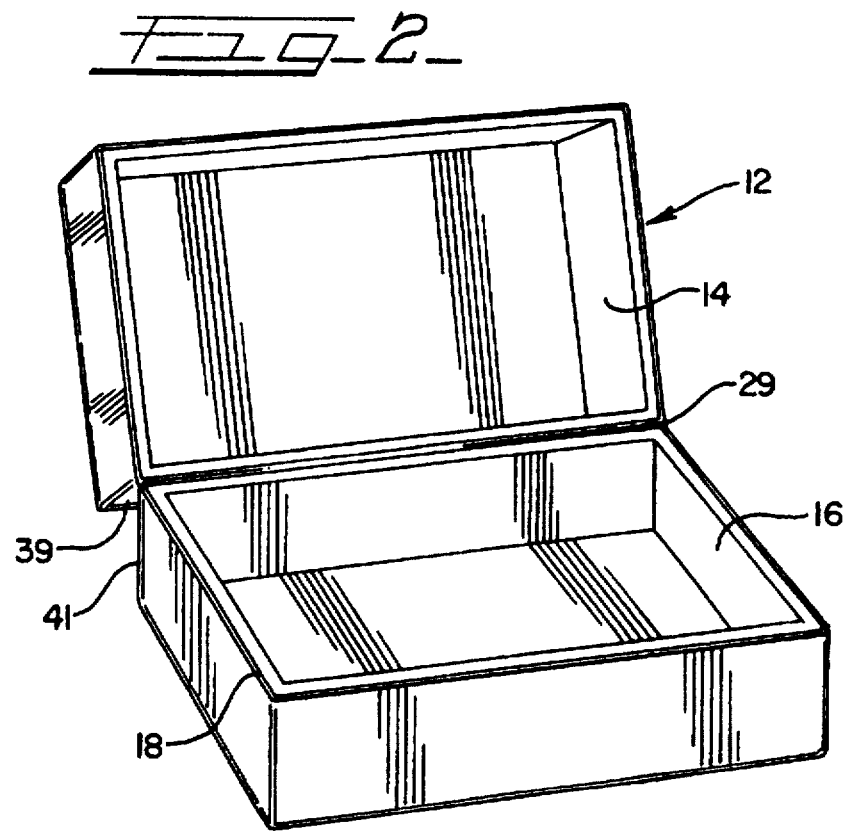
FIG. 2 is a perspective view of the interior portion of the hinged plastic article shown in FIG. 1.

In the molding of the article 12 shown in the preferred embodiment (FIGS. 1 and 2), a plastic injection mold unit 20 is provided having a stationary male mold section 22 and a movable female mold section 24 which, when the mold unit 20 is in its closed position (FIGS. 4 and 5), form mold cavities 26 and 28 for the thermoplastic members 14 and 16 respectively. The female mold section 24 has an extended mold cavity dividing member in the form of a partition wall 30 which abuts the male mold section 22, upon clamping together of the male and female mold sections 22 and 24, respectively. With the mold sections 22 and 24 in their open positions (FIG. 3), the deformable lamina 18 is placed between the male mold section 22 and the female mold section 24, the deformable lamina 18 extended between the partition wall 30 and the male mold section 22 to form a hinge 29 therebetween. In the preferred embodiment, the deformable lamina 18 extends into both of the mold cavities 26 and 28, completely lining the female mold section portion of the mold cavities 26 and 28 to provide the surface covering, as well as between the mold cavities 26 and 28 at the partition wall 30 between the mold cavities 26 and 28 to provide the hinge 29 between the resulting first and second thermoplastic members 14 and 16. Of course, where the advantages of a molded-in hinge are desired without the covering or lining aspects, the deformable lamina 18 need only extend slightly into the mold cavities 26 and 28.

The female mold section 24 is then moved toward the male mold section 22 and clamped into a closed position thereby creating the mold cavities 26 and 28 for the first and second thermoplastic members 14 and 16 respectively. A plastic material 32 is then injected into the mold cavities 26 and 28 from injection nozzles 34 and 36 through respective gate openings 38 and 40 to fill the mold cavities 26 and 28 and securely bond the deformable lamina 18 with the plastic material 32, thereby molding the first thermoplastic member to the second thermoplastic member. The partition wall 30 prevents the plastic material 32 from passing between the mold cavities 26 and 28 and from contacting the hinge portion 29 of the deformable lamina 18.

After allowing the plastic material to at least partially harden, the female mold section 24 is then moved away from the male mold section 22 and the resultant hinged plastic article 12, having a combined surface covering and hinge formed from the deformable lamina 18 integrated in a total bonded relationship with the first and second thermoplastic members 14 and 16, is removed.

The hinge portion 29 of the deformable lamina 18 extends between corresponding sides 39 and 41 of the thermoplastic members 14 and 16 respectively, the corresponding sides 39 and 41 which are spaced from one another. It has been found that the closer the thermoplastic members 14 and 16 are positioned toward one another, while still having an extending hinge portion of the deformable lamina 18 therebetween, the stronger the hinged article will be. This is due to the fact that the deformable lamina 18 has little rigidity.

The deformable lamina 18 may be comprised of any woven or non-woven material, textile, vinyl, film, or other like materials which can be deformed into the shape of the mold cavities 26 and 28 to at least partially cover desired surfaces of the thermoplastic members 14 and 16 while being strong enough to hinge the thermoplastic members 14 and 16 together.

The article 12, having the deformable lamina 18 integrated with the first and second thermoplastic members 14 and 16, thus constitutes an integral one-piece unit which, depending on the material and configuration of the deformable lamina 18, the thermoplastic members 14 and 16, the plastic material 32, and the positioning of the deformable lamina 18 within the mold cavities 26 and 28, has a variety of applications. For example, this method could be utilized to form the hinged container shown in FIGS. 1 and 2 in which a combined exterior covering and hinge are formed from the deformable lamina 18 and integrated with the thermoplastic members 14 and 16. Such containers have traditionally been molded into a single piece of plastic with the hinge section being reduced in width and/or thickness. Such a plastic hinge often breaks under the fatigue of repeated opening and closing of the container. The deformable lamina hinge will provide a stronger hinge rather than the weakened section of plastic used previously. Furthermore, by molding in the deformable lamina 18, the expensive and inferior step of gluing decorative surface coverings about the thermoplastic members 14 and 16 of the prior art is eliminated.

It is anticipated that this process can be used to form all types of hinged plastic articles such as headrests, armrests, and sun visors for the automotive industry where the attachment hardware could be concealed within the hinged housing and the desired surface covering is exposed. The process could also be used to mold a backpack, a cover for a book or any other hinged article wherein the hinged members are at least partially made from injection molded plastic.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, while the preferred embodiments show the deformable lamina as covering the entire exterior or interior surface of the thermoplastic members, it is anticipated that the deformable lamina may only cover certain desired portions of these surfaces such as those surfaces which are adjacent to the hinge portion of the deformable lamina only.

I claim:

1. A process of injection molding for molding a thermoplastic article having a first thermoplastic member, a second thermoplastic member, and a hinge formed from a deformable lamina, said deformable lamina at least partially extending over a surface of said first thermoplastic member and a surface of said second thermoplastic member, said deformable lamina thereby hinging said first and said second thermoplastic members together, said process comprising the steps of:

(a) providing a mold unit having a first mold section and a second mold section opposite to and in mating alignment with said first mold section, said first mold section having an extended mold cavity dividing member, said second mold section having a recess for receiving therein said extended mold cavity dividing member of said first mold section, upon clamping together of said first and second mold sections;

(b) placing said deformable lamina between said first mold section and said second mold section, said deformable lamina extended between said mold cavity dividing member on said first mold section and said corresponding recess on said second mold section to form a hinge portion therebetween;

(c) clamping said first mold section and said second mold section together using clamping means thereby forming mold cavities for said first thermoplastic member and said second thermoplastic member;

(d) placing said mold cavity dividing member over at least said hinge portion of said deformable lamina, said mold cavities separated by said mold cavity dividing member, said mold cavity dividing member allowing said deformable lamina to pass between said mold cavities;

(e) providing a first gate through which a plastic injection material will be injected from outside said mold cavity of said first thermoplastic member into said mold cavity of said first thermoplastic member;

(f) providing a second gate through which said plastic injection material will be injected from outside said mold cavity of said second thermoplastic member into said mold cavity of said second thermoplastic member;

(g) injecting said plastic material through said first and said second gates into said mold cavities and in bonding securement of said deformable lamina, thereby molding said first thermoplastic member and said second thermoplastic member, said mold cavity dividing member preventing said plastic material from passing between said mold cavities and from contacting said hinge portion of said deformable lamina;

(h) allowing said plastic material to at least partially harden: and (i) removing said resultant thermoplastic article from said mold cavities with said deformable lamina hinge integrated with said first and second thermoplastic members.

2. The process, according to claim 1, wherein corresponding sides of said first thermoplastic member and said second thermoplastic member are spaced from one another and wherein said deformable lamina extends between said corresponding sides.

3. The process, according to claim 1, wherein said deformable lamina extends over an entire exterior surface of said first thermoplastic member and an entire exterior surface of said second thermoplastic member.

4. The process, according to claim 1, wherein said deformable lamina extends over an entire interior surface of said first thermoplastic member and an entire interior surface of said second thermoplastic member.

5. A process of injection molding for molding a thermoplastic article having a first thermoplastic member, a second thermoplastic member, and a combined surface covering and hinge formed from a deformable lamina, said deformable lamina at least partially extending over a surface of said first thermoplastic member and a surface of said second thermoplastic member, said deformable lamina thereby at least partially covering said surfaces of said first and said second thermoplastic members as well as hinging said first and said second thermoplastic members together, said process comprising the steps of:

(a) providing a mold unit having a first mold section and a second mold section opposite to and in mating alignment with said first mold section, said first mold section having an extended mold cavity dividing member, said second mold section having a recess for receiving therein said extended mold cavity dividing member of said first mold section, upon clamping together of said first and second mold sections;

(b) placing said deformable lamina between said first mold section and said second mold section, said deformable lamina extended between said mold cavity dividing member on said first mold section and said corresponding recess on said second mold section to form a hinge portion therebetween;

(c) clamping said first mold section and said second mold section together using clamping means thereby forming mold cavities for said first thermoplastic member and said second thermoplastic member;

(d) placing said mold cavity dividing member over at least said hinge portion of said deformable lamina, said mold cavities separated by said mold cavity dividing member, said mold cavity dividing member allowing said deformable lamina to pass between said mold cavities;

(e) providing a first gate through which a plastic injection material will be injected from outside said mold cavity of said first thermoplastic member into said mold cavity of said first thermoplastic member;

(f) providing a second gate through which said plastic injection material will be injected from outside said mold cavity of said second thermoplastic member into said mold cavity of said second thermoplastic member;

(g) injecting said plastic material through said first and said second gates into said mold cavities and in bonding securement of said deformable lamina, thereby molding said first thermoplastic member and said second thermoplastic member, said mold cavity dividing member preventing said plastic material from passing between said mold cavities and from contacting said hinge portion of said deformable lamina;;

(h) allowing said plastic material to at least partially harden: and (i) removing said resultant thermoplastic article from said mold cavities with said deformable lamina hinge integrated with said first and second thermoplastic members.

6. The process, according to claim 5, wherein corresponding sides of said first thermoplastic member and said second thermoplastic member are spaced from one another and wherein said deformable lamina extends between said corresponding sides.

7. The process, according to claim 5, wherein said deformable lamina extends over an entire exterior surface of said first thermoplastic member and an entire exterior surface of said second thermoplastic member.

8. The process, according to claim 5, wherein said deformable lamina extends over an entire interior surface of said first thermoplastic member and an entire interior surface of said second thermoplastic member.

* * * * *